United States Patent [19]
Taskett

[11] Patent Number: 6,115,458
[45] Date of Patent: Sep. 5, 2000

[54] METHOD AND APPARATUS FOR SUMMARIES OF PREPAID INSTRUMENT TRANSACTION ACTIVITY

[75] Inventor: John M. Taskett, Salt Lake, Conn.

[73] Assignee: American Express Travel Related Services Company, Inc., New York, N.Y.

[21] Appl. No.: 08/503,071

[22] Filed: Jul. 14, 1995

[51] Int. Cl.[7] .......... H04M 15/00; H04M 17/00; G06K 5/00

[52] U.S. Cl. .......... 379/144; 379/113; 379/114; 379/116; 379/119; 235/380

[58] Field of Search .......... 379/91, 119, 112–116, 379/144; 235/379, 380–382; 360/825.33, 825.34; 364/400, 401; 395/239, 240, 241

[56] References Cited

U.S. PATENT DOCUMENTS

| | | | |
|---|---|---|---|
| 5,003,584 | 3/1991 | Benyacar | 379/121 |
| 5,025,373 | 6/1991 | Keyses et al. | 364/408 |
| 5,030,806 | 7/1991 | Collin | 235/380 |
| 5,184,345 | 2/1993 | Sahni | 379/114 |
| 5,185,798 | 2/1993 | Hamada | 235/382 |
| 5,218,632 | 6/1993 | Cool | 379/112 |
| 5,353,335 | 10/1994 | D'Urso et al. | 379/143 |
| 5,430,794 | 7/1995 | Ayame | 379/112 |
| 5,506,893 | 4/1996 | Buscher | 379/114 |
| 5,517,549 | 5/1996 | Lee | 379/114 |
| 5,517,555 | 5/1996 | Amadon | 379/112 |

*Primary Examiner*—Steven J. Saras
*Assistant Examiner*—Vijay Shankar
*Attorney, Agent, or Firm*—Snell & Wilmer L.L.P.

[57] ABSTRACT

A system for generating and transmitting summary transaction data includes a computer database from which information is compiled and forwarded to a requesting party automatically, i.e., without the need to interface with a human operator. A party having access to a prepaid transaction account number may access the host computer from a remote location and interactively request transaction information pertaining to the account using virtually any communication modality. The computer is suitably configured to communicate with one or more of the foregoing communication modalities and to automatically compile and transmit the summary data to a requested destination, for example, to a PC. The computer may further be configured to allow the requesting party to select among various formats to configure the form of the summary data. Summary transaction data may be generated and transmitted for virtually any type of prepaid transaction card, including phone cards, travel, credit cards, stored value (e.g., smart cards) cards, and the like.

17 Claims, 3 Drawing Sheets

```
 1   AMERICAN EXPRESSCASH
 2      OCTOBER 15, 1994
 3    DENVER AIRPORT #3234

4   DEDUCTED $20.00 FROM
 5   4324 2345 2344 3321
 ─────────────────────────────
 6   AMERICAN EXPRESS PREPAID TELEPHONE
 7   SERVICE
 8   50 MINUTES OF DOMESTIC CALLS
 9   (EXPIRES OCTOBER 16, 1996)

10   DIAL 1-800-555-2323

11   ENTER YOUR AUTHORIZATION CODE:

12           324 432 4324
13   ||..|.|..|..|||....||....||.|.|.|.||.|..|.||.|.|.|..||.||

14   DIAL AREA CODE + PHONE NUMBER TO CALL
15   ANYWHERE IN THE USA OR CANADA

16   TO PLACE AN INTERNATIONAL CALL DIAL
17   011 + COUNTRY CODE + CITY CODE +
18   PHONE NUMBER

19   TO MAKE ANOTHER CALL PRESS # FOR TWO
20   SECONDS.
 ─────────────────────────────
21   FOR SERVICE OR REFUNDS CALL:
22   1-800-555-2242

23   SERVICE PROVIDED BY
24
```

Calling Card - Detailed Activity Report
July 14, 1995
Calling Card Number (Last 4 Digits Only): 4444

Calling Activity

| Date | Time | Called From | From/Location | Call To | Call/Location | Minutes | Cost |
|---|---|---|---|---|---|---|---|
| 1/3/97 | 1:05AM | (222) 555-0000 | Salt Lake UT | (111) 555-0010 | Tucson AZ | 6 6 | $ 3.57 |
| 1/4/97 | 9:15AM | (222) 555-0001 | Sandy UT | (111) 555-0009 | Dayton OH | 12 12 | $ 6.94 |
| 1/4/97 | 9:28AM | (222) 555-0002 | Salt Lake UT | (111) 555-0008 | San Jose CA | 20 20 | $ 8.56 |
| 1/20/97 | 8:03AM | (222) 555-0003 | Atlanta GA | (111) 555-0007 | Portland OR | 12 36 | $ 17.50 |
| 1/22/97 | 9:02AM | (222) 555-0004 | Brighton NY | (111) 555-0006 | New York NY | 3 3 | $ .90 |
| 1/30/97 | 3:40PM | (222) 555-0005 | Brighton NY | (111) 555-0005 | Dayton OH | 4 4 | $ 1.21 |
| 2/2/97 | 3:38PM | (222) 555-0006 | Salt Lake UT | (111) 555-0004 | Tucson AZ | 2 2 | $ .53 |
| 2/10/97 | 7:40PM | (222) 555-0007 | Sandy UT | (111) 555-0003 | Phoenix AZ | 4 4 | $ .97 |
| 2/12/97 | 8:03AM | (222) 555-0008 | Atlanta GA | (111) 555-0002 | Dayton OH | 12 12 | $ 6.94 |
| 2/14/97 | 9:10AM | (222) 555-0009 | Phoenix AZ | (111) 555-0001 | London ENG | 62 62 | $ 32.00 |

Information Services Activity

<u>Speed dial maintenance</u>

| | | | | | |
|---|---|---|---|---|---|
| 1/13/97 | 7:15AM | (222) 555-0003 | Atlanta | 5 | $ 2.57 |
| 2/4/97 | 9:00AM | (222) 555-0003 | Atlanta | 2 | $ .94 |

<u>Detailed activity report</u>

| | | | | | | | |
|---|---|---|---|---|---|---|---|
| 3/5/97 | 2:40PM | (222) 555-0003 | Atlanta GA | (111) 555-0007 | Portland OR | 8 | $ 7.50 |

Recharge Activity

Initial Purchase - $15 Card

| Date | Time | Amount Charged | Charged To | Initial Units | Units Purchased | Final Units |
|---|---|---|---|---|---|---|
| 1/4/97 | 7:00AM | $ 100.00 | American Express | 16 | 211 | 227 |

Report and Service provided by American Express Telecom    Remaining Units: 122
Salt Lake City, Utah
For 24 hour service call toll free: (800) 555-5555

FIG.6

METHOD AND APPARATUS FOR SUMMARIES OF PREPAID INSTRUMENT TRANSACTION ACTIVITY

TECHNICAL FIELD

The present invention generally relates to summaries of transaction data for prepaid, remote memory transaction instruments used by consumers to purchase goods and services, and more particularly to methods and apparatus for automatically responding to customer inquiries for summaries of transaction data for prepaid instruments.

BACKGROUND ART AND TECHNICAL PROBLEMS

Remote memory, prepaid accounts for use in purchasing goods and services are generally well known. Presently known schemes typically involve a printed document, for example a wallet-size plastic or cardboard card which bears a unique authorization or account number and instructions for access to funds, services, and the like. Such prepaid cards have been used extensively throughout the world, for example as prepaid long distance telephone calling cards.

In contrast to stored value cards (e.g., "smart cards") wherein a remaining account balance is stored within a microprocessor controlled memory resident in the card, remote memory systems typically store information pertaining to a prepaid account at a central host computer. The host computer typically stores information relating to the available balance remaining in the account, as well as information pertaining to past activity associated with the account. In particular, the host computer may store transaction data relating to various goods or services purchased using the card. In the context of a prepaid telephone calling card, the host computer may store call record data, including the date, time, duration, and various other parameters relating to calls which were placed using the prepaid telephone card corresponding to the account. The host computer may be accessed via a telephone or data line by the consumer through the use of an authorization code, Personal Identification Number (PIN), or the like.

The use of prepaid remote memory telephone cards is particularly prevalent in the United States. A typical prepaid telephone calling card includes a toll-free telephone number used by the consumer to access a host computer system, a unique authorization code associated with the card (and, hence, the corresponding remote account), and dialing instructions. When a customer desires to use the card to place a long distance call, he dials the toll-free number, thereby accessing the host system which manages the remote accounts. By entering a predetermined authorization number, the consumer is informed by the host computer of the remaining balance. The consumer then enters the desired long distance telephone number, and the system connects the consumer with the desired calling destination. Long distance telephone charges attributed to the telephone call are deducted from the remaining balance, and the call is terminated when the account is fully consumed. A call history is also maintained by the host for each account, which call history includes information pertaining to the calls charged to the various account.

Prepaid calling cards are employed in a wide variety of applications for both personal and professional use. For example, various governmental entities and other employers often issue per diem cards to employees to accommodate employee travel; the per diem cards may be issued in predetermined amounts (e.g., $100), and permit a traveling employee to charge gasoline, rental cars, hotels, meals, and telephone calls to the prepaid account. When the charges equal the prepaid limit, the card may simply be discarded; alternatively, the card may be "recharged" by the employer, as desired. In addition, various prepaid instruments are becoming increasingly popular as gift cards, on college campuses for purchasing school and living supplies, and for use at resorts, vacation areas, theme parks, sports stadiums, and the like.

From time to time it is desirable for a card holder or a corporate issuer of a card to obtain summary data relating to transactions charged to the prepaid card. For example, an employer (or even the employee) may wish to obtain a summary of goods and services charged to a particular card, for example in connection with accounting, payroll, taxes, and other regulatory functions. In addition, many self-employed individuals may find it convenient to use a plurality of prepaid cards to facilitate the allocation of charges and expenses among various clients and expense accounts.

Presently known systems for obtaining summary data of transaction activity for prepaid instruments are unsatisfactory in several respects. Typically, summary data may be obtained by calling the issuer of the prepaid card, and requesting a summary of all or a subset of transactions relating to a particular account. In response, the issuer may generate a printed record and mail it to the requesting party; alternatively, the issuer may retrieve the data on a computer screen and simply read the summary information to the requester over the telephone.

The foregoing methods for supplying summary transaction information are cumbersome and expensive. In the first instance, the expense associated with a human operator retrieving and reading information can be quite high. Generating printed summaries and mailing them to the requesting party necessarily takes one or more days, which may be unacceptable to the requesting party in many circumstances.

A system and method is thus needed for providing summary transaction information which overcomes the shortcomings of the prior art.

SUMMARY OF THE INVENTION

The present invention provides methods and apparatus for conveniently and efficiently generating and transmitting summary transaction data relating to prepaid transaction instruments to a requesting party. In accordance with a preferred embodiment of the present invention, information is compiled and forwarded to a requesting party automatically, i.e., without the need to interface with a human operator.

In accordance with one aspect of the present invention, a party having access to a prepaid transaction account number may access the host computer from a remote location and interactively request transaction information pertaining to the account using virtually any communication modality, including voice, electronic mail, dual tone multi-frequency (DTMF) tones, a teletype machine for the hearing impaired (TTY), a personal computer (PC), a data link, facsimile, modem, and the like. In accordance with a further aspect of the present invention, the host's computer is suitably configured to communicate with one or more of the foregoing communication modalities and to automatically compile and transmit the summary data to a requested destination, for example, to a PC (e.g., via e-mail), a voice telephone extension, a TTY device, a facsimile machine, a voice mail machine, or the like.

In accordance with a further aspect of the present invention, the host computer may be configured to allow the requesting party to select among various formats, to essentially configure the form of the summary data ultimately received from the host computer.

In accordance with yet a further aspect of the present invention, the host computer system may be advantageously configured to charge a service fee to the prepaid account for which summary information is requested; in an alternate preferred embodiment, the magnitude of the service fee may be a variable function of the amount and/or complexity of the summary data requested.

In accordance with still a further aspect of the present invention, the host computer system may be configured to automatically generate periodic summary statements and transmit them to a predetermined destination without the need for a requesting party to separately request each transmission of summary transaction data.

In accordance with a further aspect of the present invention, summary transaction data may be generated and transmitted for virtually any type of prepaid transaction card, including phone cards, travel, credit cards, stored value (e.g., smart cards) cards, and the like.

BRIEF DESCRIPTION OF THE DRAWING FIGURES

The present invention will hereinafter be described in conjunction with the appended drawing figures, wherein like numerals are used to note like elements, and:

FIG. 6 is a schematic diagram of an exemplary format of summary transaction data in accordance with one aspect of the present invention.

DETAILED DESCRIPTION OF PREFERRED EXEMPLARY EMBODIMENTS

Figure 1:
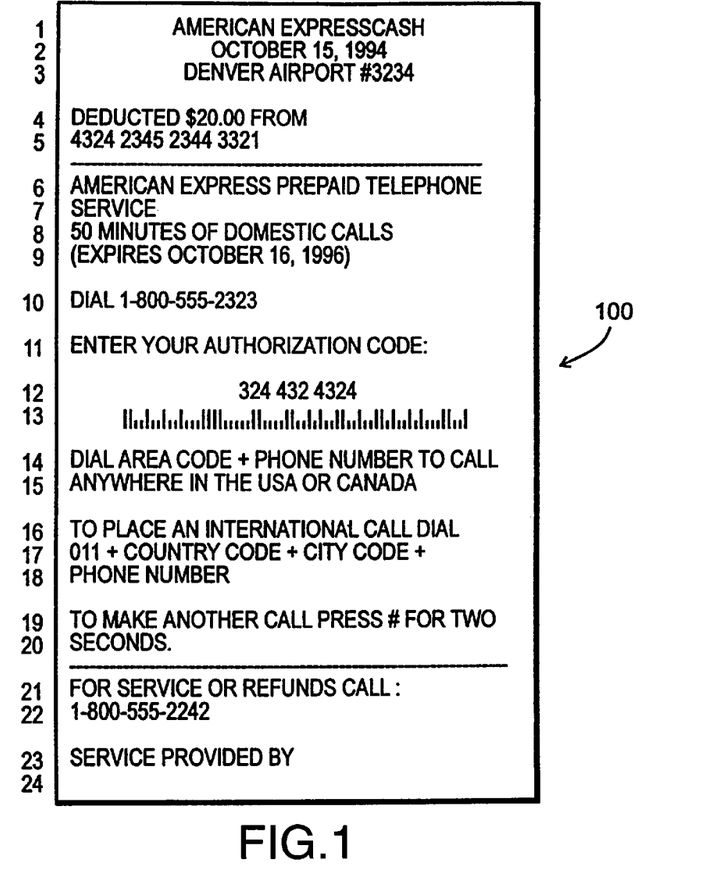
FIG. 1 is an exemplary pre-paid transaction instrument in accordance with the present invention.

Referring now to FIG. 1, an exemplary prepaid instrument 100 suitably comprises a prepaid transaction card, for example a prepaid long distance telephone card. In this regard, although a preferred exemplary embodiment of the present invention surrounds a prepaid telephone card and methods and apparatus for compiling and transmitting summary calling data to a requesting party, it will be understood that the invention is not so limited in particular, it will be appreciated that the present invention contemplates virtually any type of prepaid transaction card instrument or methodology for virtually any type of goods or services of whatever kind or nature, in that the methods and apparatus described herein for configuring a host computer to respond to requests for summary transaction data may be applied in any of these contexts.

With continued reference to FIG. 1, an exemplary calling card may comprise a wallet-sized, credit card-like instrument made of paper, plastic, cardboard, or any other convenient material. Although the present invention contemplates stored value cards (e.g., smart cards), prepaid instruments which bear a magnetic stripe, and various other configurations, a preferred exemplary embodiment described herein surrounds a prepaid telephone card which bears dialing instructions for permitting the holder of the card to make toll-free telephone calls from virtually any telephone extension.

Prepaid calling cards may be purchased from a variety of retail outlets, for example, convenience stores, drug stores, gas stations, supermarkets, and the like. Alternatively, presently known ATMs, POS devices, and the like may be conveniently configured in accordance with the present invention to print an exemplary instrument 100; hence, instrument 100 may be analogous in its physical embodiment to a receipt of the type typically printed by an ATM at the conclusion of an ATM transaction. For a more thorough discussion of ATM and POS generated prepaid instruments, see copending U.S. patent application Ser. No. 08/456,525, entitled *Methods and Apparatus for Providing a Prepaid, Remote Memory Customer Account,* filed Jun. 1, 1995, by the present inventor, the entire disclosure of which is hereby incorporated herein by this reference. In addition, for a comprehensive discussion of refundable prepaid telephone cards, reference is hereby made to copending U.S. patent application Ser. No. 08/458,715, entitled *Refundable Prepaid Telephone Card,* filed Jun. 1, 1995, by the present inventor, the entire disclosure of which is also incorporated herein by this reference.

With continued reference to FIG. 1, instrument 100 may be configured to embody various information pertaining to the prepaid account, depending on the nature of the prepaid transaction card, the manner in which the "card" is generated (e.g., via ATM), the nature and identity of the card issuer, the nature of the goods and services to be purchased using the card, and the like. In accordance with the illustrated embodiment, instrument 100 suitably embodies information pertaining to the issuer of the instrument (line 1), the date and/or time of issuance (line 2), and the location of the machine which issued the instrument with virtually any degree of specificity (line 3).

In addition, the prepaid amount (line 4) as well as the source of the funds (line 5) (e.g., checking account number) may also be set forth. In this regard, it may be desirable under certain circumstances to allow the purchaser of the instrument to select the prepaid amount from a predetermined menu, which may include values of $5.00, $20.00, $100.00, or any desired amount.

Alternatively, in circumstances where a prepaid instrument is purchased through an ATM, PC, POS, or other modality which permits the user to interactively configure one or more of the parameters associated with the card, it may be desirable to allow the consumer to enter any particular amount (e.g., $34.77, $3,409.20) to precisely conform to the value of the transaction for which the instrument is used. By eliminating the need for the merchant to give change back to the purchaser, the use of the cash may be entirely avoided.

With continued reference to FIG. 1, a brief description of the nature of the instrument may be set forth (lines 6–8), including, if desired, the number of minutes of long distance calls provided by the instrument, if appropriate (line 8). In certain applications, it may also be desired to set forth the expiration date (line 9) or any other relevant parameters or characteristics pertaining to the instrument and the nature of its intended use.

In accordance with a further aspect of the present invention, user friendly instructions may be set forth on the instrument to explain to the consumer how the instrument is to be used to effect transactions. In accordance with the illustrated embodiment, instrument 100 suitably sets forth dialing instructions for permitting a user to employ the instrument to make long distance telephone calls. More particularly, instrument 100 instructs the user to dial a telephone number (line 10), for example, a toll-free 800 number, to access the host computer which maintains the account from which "funds" are "withdrawn" or otherwise consumed as a consequence of the long distance telephone calls made in accordance with instrument 100. The instrument thereafter instructs the user (line 11) to enter a predetermined authorization code (line 12) which is preferably unique to a particular instrument. In accordance with a further aspect of the present invention, a bar code (line 13) or other suitable indicia of an authorization code may also be exhibited on the instrument, for example to permit its use with bar code readers, as discussed in greater detail below.

Instrument 100 is further configured to instruct the user to dial a desired destination telephone number (lines 14 and 15); instrument 100 may optionally provide additional instructions for international calls, subsequent calls without hanging up or any other described feature (lines 16–20). If desired, instrument 100 may also instruct the user to contact a customer service number (lines 21–22) as desired.

Given the robust configuration of the present invention, virtually any additional information, data, or even advertising copy may be set forth on the instrument 100 (e.g., lines 23–24).

Figure 2:
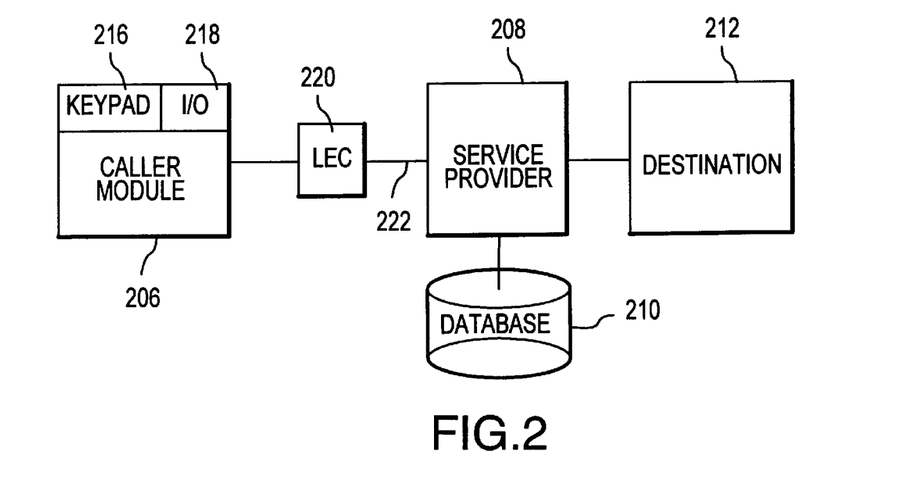
FIG. 2 is a schematic block diagram of a first embodiment of the present invention wherein the instrument of FIG. 1 is used in the context of a long distance telephone service system.

Referring now to FIG. 2, a first embodiment of a distributed transaction system suitably comprises a host computer network (service provider) 208 having a database 210 associated therewith, and a calling party module 206 configured to communicate with the host's system via communications link 222. In a preferred embodiment where caller module 206 comprises a telephone, PC or other modem-equipped apparatus, the caller is suitably routed to service provider 208 by way of a Local Exchange Carrier (LEC) 220. In an alternate embodiment, caller module 206 may comprise a teletype (TTY) device used by the hearing impaired to communicate telephonically, whereupon the TTY device may establish communication with host 208 through a conventional telephone hook up via LEC 220 or, alternatively, the TTY may be routed to the service provider by way of an intervening Relay Service, for example a government or private industry sponsored relay service for facilitating communication between hearing impaired persons and other hearing impaired persons, data networks, or voice telephone extensions.

In accordance with one aspect of the present invention, the functions of service provider 208 may suitably be performed by a financial institution, credit card issuer, or other entity issuing instruments 100. Those skilled in the art will appreciate that service provider 208 includes suitable computing hardware for effecting the functions set forth herein. Specifically, database 210 is advantageously configured to manage various aspects of the prepaid accounts in the context of the present invention. For example, database 210 may include storage capacity for information relating to the various calls charged to each account managed by service provider 208, as discussed in greater detail below in connection with FIG. 3.

With continued reference to FIG. 2, a consumer may use the information reflected in instrument 100 to place long distance telephone calls in the context of the distributed processing systems set forth in FIG. 2 in the following manner.

In a preferred embodiment, data entry module 206 suitably comprises a conventional touch tone telephone; alternatively, data entry module 206 may comprise a PC or any other suitable data entry terminal capable of interfacing with a telephone line 222. The consumer in possession of instrument 100 executes the instructions set forth thereon through an appropriate keypad 216 associated with telephone 206. In an alternate embodiment, it may be desirable to enter certain data into data entry terminal 206 through an alternative input/output modality 218, for example by reading bar code data, magnetic stripe data, voice recognition, TTY, or any other suitable medium.

In the illustrated embodiment, upon dialing the access number (line 10, FIG. 1), the telephone call is routed by the Local Exchange Carrier (LEC) 220 to service provider 208 associated with the aforementioned toll free telephone number. If desired, service provider network 208 may be configured to interactively request information from the consumer, for example through the use of voice prompts, text prompts, tones, icons, or the like. In a preferred embodiment, the user enters data into data entry module 206 through keypad 216; however, it may also be desirable under certain circumstance to employ voice recognition circuitry within service provider 208 to permit the consumer to "speak" information into data entry terminal 206. In any event, once the information pertaining to the authorization code (line 12, FIG. 1) is received by the service provider 208, a correlation is made between the authorization code and a particular account resident in database 210. Upon determining the current available "balance" in the account, the service provider may inform the consumer of the amount of long distance time available in the account or any other relevant parameter.

Upon entering the desired destination telephone number into data entry terminal 206, either in response to a voice prompt from service provider 208 (or through screen displays in the embodiment wherein data entry terminal 206 is a PC), service provider 208 connects or otherwise permits the connection of telephone 206 with a requested destination telephone extension 212. In the illustrated embodiment, destination 212 suitably corresponds to the telephone extension of the area code and phone number entered into data entry module 206 by the consumer. During the course of successive long distance telephone calls, service provider 208 incrementally decreases the available balance in the consumer's account until the account is fully withdrawn, at which time service provider 208 may inform the calling party that the account is fully withdrawn and either invite the calling party or the called party to make other arrangements for payment in order to continue the call, or simply terminate the call.

In the embodiment shown in FIG. 2, service provider network 208 comprises telephone switching equipment suitable for connecting long distance telephone calls. Alternatively, service provider 208 may be connected electronically to a remote long distance carrier (not shown) in order to facilitate the completion of long distance telephone calls.

With continued reference to FIG. 2, in accordance with an alternative embodiment of the present invention, destination 212 may comprise virtually any "destination", for example a telephone, modem, or facsimile extension, a TTY, an e-mail destination, a service provider, or a provider of data or information. In this regard, and as briefly discussed above, data entry module 206 may comprise a PC or other processing terminal configured to access a telephone or data network through hardware link 222. In accordance with this alternative embodiment, destination 212 may be suitably configured to download data or information to PC 206 from a physically distant source, for example in the context of the Internet or other data network accessible to both the host computer and the party requesting summary data. Moreover, the account maintained by service provider 208 relating to the instrument 100 used by the consumer to access destination 212 may also be employed to essentially pay for the data downloaded by destination 212 into PC 206. That is, although service provider 208 is equipped to credit value from a particular account in respect of long distance telephone charges, service provider 208 may also be conveniently configured to credit dollar values from the caller's account to a second account maintained by service provider 208 in respect of destination 212. In this way, instrument 100 may be employed by the consumer to, in effect, pay for data downloaded by destination 212 to PC 206 under the control of (or at least facilitated by) service provider network 208.

Figure 3:
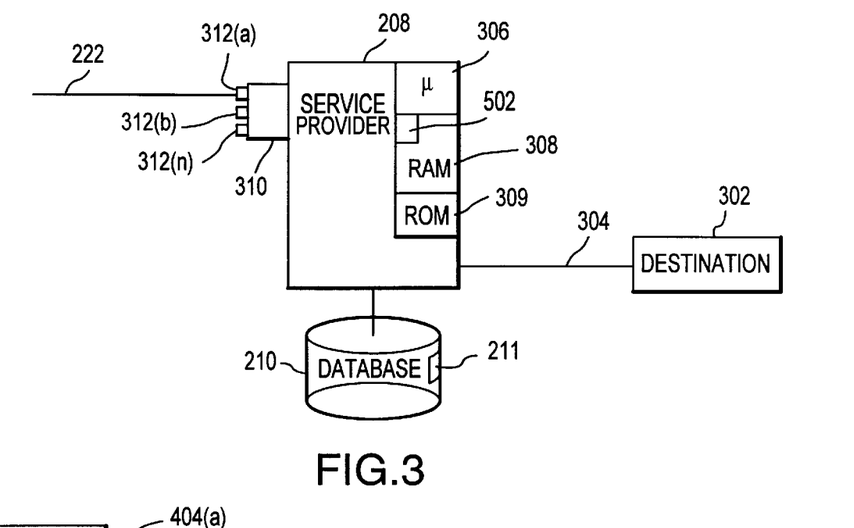
FIG. 3 is a schematic block diagram of an exemplary host computer system in accordance with the present invention.

Referring now to FIG. 3, service provider 208 may also be conveniently configured to manage the call record data associated with the various telephone calls placed through the prepaid accounts maintained by service provider 208. In particular, database 210 suitably comprises a call record sector 211 which includes relevant information pertaining to each call associated with each unique account. Although the illustrated embodiment is described in connection with call record data, it will be appreciated that the present invention may be employed in virtually any context. For example, a prepaid instrument used to purchase other goods or services may result in the compilation of data by service provider 208 relating to the purchase of those goods and services. In that regard, the data relating to the purchase of goods and services would be suitably maintained in sector 211, and retrieved and provided to a requesting party in much the same manner described herein with respect to call record data.

With continued reference to FIGS. 2 and 3, host system 208 suitably comprises a controller 306, a RAM 308, and an incoming call trunk 310. Trunk 310 suitably comprises one or more incoming telephone lines 312(a)–312(n). In accordance with a preferred embodiment, first incoming line 312(a) corresponds to a first predetermined telephone number (e.g., an 800 telephone number or a 900 telephone number), or a first predetermined series of telephone numbers, as desired. Similarly, second incoming line 312(b) corresponds to a second predetermined telephone number (or a series thereof, and so on. Thus, service provider 208 may be configured to accommodate a large number of incoming telephone lines to thereby facilitate the allocation of particular feature sets to corresponding telephone lines.

More particularly, host system 208 may suitably be configured to process incoming calls from a wide variety of caller hardware configurations, including PCs, voice telephone extensions, facsimile machines, modems, TTY devices, data networks, and the like. Host system 208 may thus be configured to process various incoming calls as a function of the anticipated hardware and other characteristics associated with the incoming call. Moreover, certain of the incoming lines may be configured to process incoming calls based on non-hardware configurations, for example language, and the subject matter of the call. More particularly, a first telephone line 312(a) may be used to process voice incoming calls in English, whereas a second incoming line may be dedicated to processing voice calls in Spanish or any other language. Furthermore, a third incoming line may be dedicated to processing calls from TTY devices, a fourth incoming line may be configured to process incoming calls from data networks, and so on.

In accordance with a further aspect of the present invention, processor 306 is suitably configured to retrieve appropriate software modules from ROM 309 to facilitate call processing, and to retrieve predetermined message packets, for example prerecorded voice prompts, text messages, and the like from database 210, as desired.

With continued reference to FIG. 3, host system 208 may be conveniently configured to process requests for information, for example information pertaining to summaries of data relating to various accounts maintained by the host system. In accordance with a preferred embodiment, host system 208 is suitably configured to receive an incoming request from communication link 222 (FIG. 2) for call record data pertaining to a particular account, and to process the request and transmit a summary of transactions pertaining to that particular account to a destination specified by the requesting party. In this regard, it may be desirable to allocate or dedicate one or more incoming lines (and corresponding telephone numbers) 312 to calls relating to requests for summaries of transaction data.

Figures 4A, 4B:
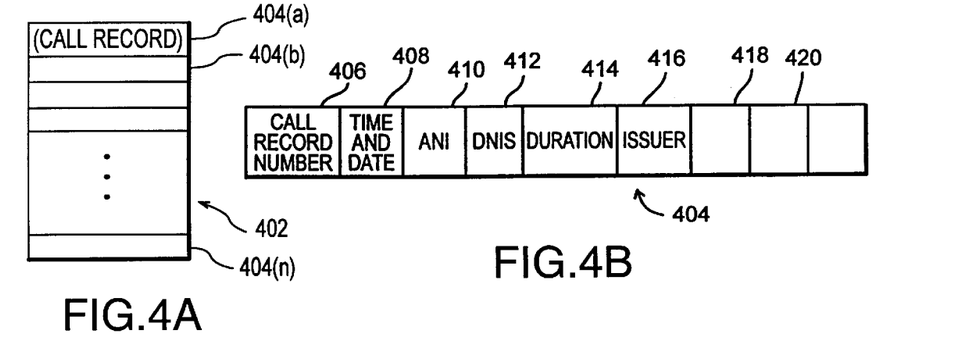
FIG. 4A is a schematic representation of a memory sector setting forth a plurality of requests for summary transaction data.
FIG. 4B is a detailed view of an exemplary one of the request messages shown in FIG. 4A.

Referring now to FIGS. 3 and 4, sector 211 suitably includes call record data relating to the various accounts maintained by the host. More particularly, an exemplary sector 402 suitably includes call record data pertaining to a particular account corresponding to a particular prepaid transaction instrument (calling card). With specific reference to FIG. 4, memory sector 402 suitably includes a plurality of call records 404(a)–404(n), each call record corresponding to a particular telephone call which was placed using the prepaid phone card corresponding to the particular account reflected in memory sector 402.

Referring now to FIG. 4B, each call record 404 suitably embodies a plurality of fields corresponding to various parameters associated with the call. For example, a first field 406 may correspond to a call record number used by host system 208 to track the various call records associated with the various accounts. A second field 408 may include information relating to the time and date the call was placed. A third field 410 suitably relates to the location from which a call was placed; for example, the area code, prefix, and four-digit telephone number of the particular telephone extension from which the call was placed, and may also include the city, state and/or country from which the call was placed. A field 412 suitably includes information relating to the destination telephone number, for example including the telephone number and city, state, and country of the called party. A field 414 suitably corresponds to the duration of the call, for example in minutes and seconds, and may also include information pertaining to the cost of the call, for example in the context of international calls, or calls which incurred charges other than long-distance toll charges, including 900 number fees, access fees, on-line service fees, and the like. A field 416 may also be included which contains information relating to the issuer of the card, particularly if the issuer of the card is different from the company which maintains service provider 208. If desired, a subsequent field 418 may be provided which embodies information pertaining to the account holder, whether as an individual or as an employer or affiliate of an organization.

Finally, one or more additional fields 420 may be included to permit service provider 208 and/or the various account holders to customize call record data in accordance with their particular accounting, inventory, and cost allocation preference.

Figures 5A, 5B:
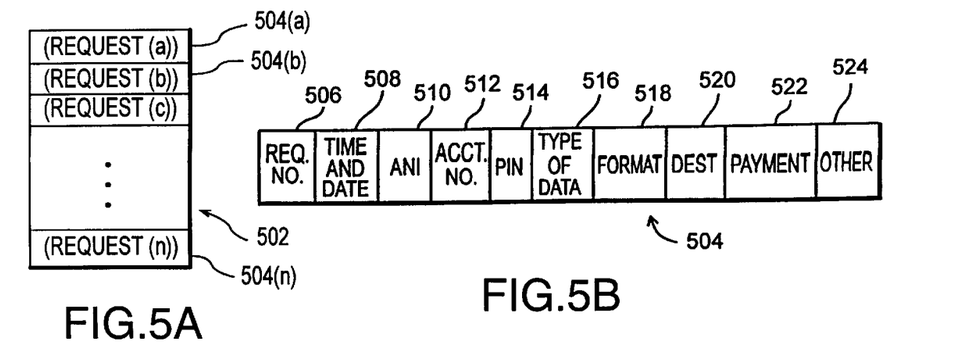
FIG. 5A is an exemplary memory sector setting forth a plurality of call records for a particular account.
FIG. 5B is a detailed view of an exemplary one of the call records of FIG. 5A.

Referring now to FIG. 5, host system 208 may be conveniently configured to selectively retrieve some or all of the call record data from sector 402 (FIG. 4A) (or, indeed, any sector within call record data base 211), and format the data as desired for transmission to a requesting party. More particularly, a party may request information pertaining to the number of calls made within a predetermined number of days, or simply the last predetermined number of calls, or even all calls relating to a particular account. Moreover, the request may include selected fields 406–420 (FIG. 4B) for some or all of the call records. That is, a party may request only the date, duration, and destination of various calls; alternatively, a party may request the precise time at which calls were made, and the location from which the calls were made, or indeed any combination of information fields from the call record.

In addition, the summary data requested by the caller may be configured in a manner most useful to the requesting party. For example, a plurality of predetermined summary data formats may be stored as templates in system 208; in addition, system 208 may be configured to permit the requesting party to specify a particular format and/or customize the format of the summary data, as desired.

Referring now to FIGS. 3 and 5, a request for summary data may be conveniently received by host system 208 via trunk 310, for example, in a manner analogous to the receipt of incoming long-distance telephone calls, as discussed above in connection with FIG. 3. Upon receipt of a request for summary data, controller 306 retrieves a predetermined subroutine from ROM 309, which subroutine is configured to communicate with the request. For example, if the request is from a human caller on a voice line, host system 208 will retrieve a subroutine configured to elicit voice and/or DTMF responses from the caller using voice or other prompts. Alternatively, if the request for summary data is from a TTY device, a modem, a PC (e.g., in the form of an e-mail request), or some other modality, then host system 208 will retrieve a subroutine which will permit host system 208 to communicate with the requesting entity in a manner compatible with the format and communication protocol of the request.

When a request for summary data is received by host system 208, the request is formatted and temporarily stored in a request data sector 502 within RAM 308.

With continued reference to FIG. 5, request sector 502 suitably comprises a plurality of individual requests 504(a)–504(n). Each request 504 within data sector 502 suitably comprises a plurality of fields, including one or more of the following fields.

The first field 506 suitably contains information regarding the request number used by host system 208 for tracking the request within the system. In addition, the request number in field 506 may also indicate the position within the queue comprising the various requests that this particular request occupies. A second field 508 suitably includes the time and date at which the request was received. A third field 510 suitably includes information pertaining to the location of the requesting party (e.g., telephone number, city, state, country). A fourth field 512 suitably relates to the particular account number or numbers for which summary data is requested. A fifth field 514 may include security information, such as a PIN or the like. In this regard, it may be advantageous to provide access to the summary account request feature to persons in addition to, or other than, the individuals in possession of the account numbers. For example, in the context of company issued prepaid instruments for employees to have access to their respective account numbers to thereby use the card to obtain products and services, while giving security access to the employer's accounting department to request summaries of transaction activity. For example, for the purpose of compiling tax and accounting records or to audit the spending habits of the company's employees.

A sixth field 516 suitably includes one or more subfields which permit the requesting party to specify those calls for which information is requested, as well as the information desired relating to those calls. Field 518 suitably contains one or more subfields which permit the requesting party to specify or otherwise configure the format of the summary data to be transmitted to the requester. For example, the requestor may desire to have the summary data formatted in a manner consistent with a particular company's internal accounting documents; alternatively, a company may prefer to have call data compiled by region (e.g. area code) rather than chronologically, for example.

A destination field 520 suitably includes information regarding the destination to which the summary data should be sent, for example, to a fax number, a remote PC file, a postal address, an interactive voice response machine, or the like.

A payment field 522 suitably comprises information relating to the method which the requesting party would like to use to pay for the transaction summary. In a preferred embodiment, host system 208 may be configured to deduct the cost of preparing and transmitting the transaction summary from the account to which the data relates; alternatively, the charge for the summary service may be deducted from any other account, provided proper security for accessing that account is possessed by the requesting party. As yet a further alternative, particularly in the context of voluminous data summaries, host system 208 could render a bill to the requesting party as a method of payment, or arrange to charge the service fee to a credit card, debit card, or other account.

Various other fields and/or subfields 524 may also be incorporated into request message 504, in addition to or in lieu of one or more of the above described fields.

With continued reference to FIGS. 3–5, host system 208 (FIG. 2) may be suitably configured to store data summary requests 504 in request sector 502, and to periodically pull sector 502 to detect the presence of summary data requests. Upon detecting the presence of a summary data request 504, controller 306 may be suitably configured to process the request in accordance with one or more respective fields 506–524, and to transmit the summary data report to the requested destination 302 over communication link 304, for example a conventional telephone line.

Referring now to FIG. 6, an exemplary transaction summary report 600 may be formatted in virtually any desired manner. As briefly mentioned above, one or more "default" formats may be employed by the host, in addition to a plurality of predefined alternate formats, which may be advantageously selectable by the requesting party in his request for summary transaction data. In addition, it may be desirable to permit the requesting party to customize an existing format or even design a new format unique to the requesting party.

More particularly, summary data sheet 600 suitably comprises one or more of a first sector 602 relating to typical long distance telephone call activity, a second sector 604 relating to service activity, e.g., relating to charged incurred by a customer for accessing remote databases, service providers, and the like, and a third sector 606 relating to the status of the account to which the transaction activity pertains, for example the available balance in the prepaid account, additional "recharging" employed to replenish the account, and the like. In addition, various other information, including the name, address, and telephone number of the card issuer, similar information and perhaps a customer service number relating to the entity providing the transaction data summary service, other advertising material, and the like.

Although the present invention is set forth herein in the context of the appended drawing figures, it should be appreciated that the invention is not limited to the specific forms shown. By employing the principles of the present invention in the context of other devices, data networks, and commercial and financial transactions not specifically discussed herein, dramatically enhanced functionality and features may be provided to consumers, merchants, and financial institutions with relatively little increased infrastructure, hardware, or other costs, while affording additional security, inventory control, billing and accounting advantages not presently available with existing systems. These and other modifications and enhancements in the design and arrangement of the various components, processes, steps and descriptions thereof as set forth herein may be made without departing from the spirit and scope of the present invention as set forth in the appended claims.

I claim:

1. A system for electronically providing a summary of information relating to a prepaid calling card account in response to a request received from a remote source, comprising:
    a database configured to store at least one record of information relating to each of a plurality of accounts having respective unique account identifiers; and
    a computer configured to access the database based on a unique account identifier transmitted with the request, including:
        a request input system configured to receive the request from the remote source;
        a search system configured to retrieve at least a portion of the information in said records from the database relating to the account based on the unique account identifier received from the request input system;
        a summary generator configured to generate a summary of the retrieved information from the database in accordance with a selected format, wherein the summary generator is configured to generate said summary in a format indicated in the request; and
        a summary output system configured to electronically transmit the summary generated by the summary generator to a destination.

2. A system for electronically providing a summary of information relating to a prepaid calling card account in response to a request received from a remote, source, comprising:
    a database configured to store at least one record of information relating to each of a plurality of accounts having respective unique account identifiers wherein said database is configured to store information relating to a plurality of accounts for purchasing at least one of goods and services; and
    a computer configured to access the database based on a unique account identifier transmitted with the request, including:
        a request input system configured to receive the request from the remote source;
        a search system configured to retrieve at least a portion of the information in said records from the database relating to the account based on the unique account identifier received from the request input system;
        a summary generator configured to generate a summary of the retrieved information from the database in accordance with a selected format; and
        a summary output system configured to electronically transmit the summary generated by the summary generator to a destination.

3. A system for electronically providing a summary of information relating to a prepaid calling card account in response to a request received from a remote source, comprising:
    a database configured to store at least one record of information relating to each of a plurality of accounts having respective unique account identifiers;
    a computer configured to access the database based on a unique account identifier transmitted with the request, including:
        a request input system configured to receive the request from the remote source;
        a search system configured to retrieve at least a portion of the information in said records from the database relating to the account based on the unique account identifier received from the request input system;
        a summary generator configured to generate a summary of the retrieved information from the database in accordance with a selected format; and
        a summary output system configured to electronically transmit the summary generated by the summary generator to a destination;
        and
    wherein said computer system is configured to automatically charge said account upon generating said summary.

4. The system of claim 3, wherein said computer system varies the amount of said charge to the account according to preselected criteria.

5. The system of claim 4, wherein said preselected criteria include at least one of a magnitude of the request and the complexity of the request.

6. A computer system for providing summaries of prepaid telephone calling card activity, comprising:
    a first RAM sector for compiling a queue of request messages received electronically from remote requesting parties in respect of prepaid calling card accounts maintained by the computer, each said request message including a first field relating to a unique account, a second field relating to a destination to which said account summary is to be transmitted by said computer, and a third field relating to the format of said summary data;
    a call record database associated with the computer for storing, for each of a plurality of said prepaid accounts maintained by said computer, a call record history including information pertaining to a plurality of telephone calls associated with a particular account; and
    a control circuit for discriminating between requests received from a voice incoming telephone call and requests received from a non-voice incoming call, and for processing said requests in accordance with the voice or non-voice character of the request.

7. The system of claim 6, wherein said computer system is configured to generate summaries at regular time intervals and transmit such summaries to a preselected destination.

8. The system of claim 6, wherein said request input system includes a multiple line telephone trunk.

9. The system of claim 8, wherein said multiple line telephone trunk includes at least one line dedicated to receiving summary requests.

10. The system of claim 6, wherein said computer system includes an interactive voice response system configured to interact with a requesting party.

11. The system of claim 6, wherein said request input system is configured to receive at least one of voice data, digital computer data, DTMF data, and an electronic mail data.

12. The system of claim 6, wherein said computer system is configured to automatically charge each account subject to at least one of said requests.

13. The system of claim 12, wherein said computer system varies the amount of said charge to the account according to preselected criteria.

14. The system of claim 13, wherein said preselected criteria include at least one of a magnitude of the request and the complexity of the request.

15. The system of claim 6, wherein said control circuit includes a summary generator configured to generate said summary of said call record history in a format indicated in the request.

16. The system of claim 6, wherein said destination is a personal computer, a voice-compatible telephone, a TTY device, a facsimile device, or a voice mail system.

17. The system of claim 14,6 wherein said destination is identical to the source of the request.

* * * * *